FLOW CONTROL FOR VENTILATING HOOD

Original Filed Jan. 21, 1965 3 Sheets-Sheet 1

INVENTOR
JAMES E. STALKER
BY D. Earl Richards
ATTORNEY

FLOW CONTROL FOR VENTILATING HOOD

Original Filed Jan. 21, 1965 3 Sheets-Sheet 2

INVENTOR
JAMES E. STALKER
BY D. Earl Richards
ATTORNEY

FLOW CONTROL FOR VENTILATING HOOD

Original Filed Jan. 21, 1965 3 Sheets-Sheet 3

INVENTOR
JAMES E. STALKER
BY D. Bruce Richards
ATTORNEY

United States Patent Office

Re. 27,225
Reissued Nov. 9, 1971

27,225

FLOW CONTROL FOR VENTILATING HOOD

James E. Stalker, Dallas County, Tex., assignor to Home Metal Products Company, Plano, Tex.

Original No. 3,387,431, dated June 11, 1968, Ser. No. 426,782, Jan. 21, 1965. Application for reissue May 26, 1969, Ser. No. 835,287
The portion of the term of the patent subsequent to May 3, 1983, has been disclaimed
Int. Cl. B01d *46/00*

U.S. Cl. 55—470 19 Claims

Matter enclosed in heavy brackets [ ] appears in the original patent but forms no part of this reissue specification; matter printed in italics indicates the additions made by reissue.

ABSTRACT OF THE DISCLOSURE

A ventilating kitchen hood including a casing in the form of a rectangular polyhedron with a short wide front opening and having a drawer slidable through the front opening. The drawer has an intake port extending across a portion of the bottom panel and includes duct structure having an air filter therein. A fan mounted within the casing draws air into the drawer, through the air filter and out of the casing.

This invention relates to a ventilating hood of the type employed for treating fumes and vapors over food preparation areas, and more particularly to the control of air flow through filtartion elements.

In a more specific aspect, the invention relates to pull-out type ventilating hoods for kitchens.

There has developed a demand for ventilating kitchen hoods which minimize the space required therefor and which, at the same time, will provide an adequate flow of air so that undesirable vapors and entrained grease and the like may be removed from the air above a food preparation area. By the present invention, a system is provided which occupies a minimum of space, which may be retracted when not in use, and which provides specifically for the control of air flow through filters and over the motor driving the fan.

In accordance with the invention, a kitchen filter is provided which has a casing in the form of a rectangular polyhedron with a short wide front opening. A drawer is slidable through the front opening and has an intake port extending across the front half of a bottom panel. A fan is mounted within the casing adjacent to a rear panel for drawing air into the drawer through the intake port. Duct structure directs air flow from the fan out of the casing. An air filter is positioned in a plane parallel to the intake port and in the air path leading to the fan. A secondary duct structure preferably is provided for directing air through the motor and into the air stream propelled by the fan.

In one form the filter is a ductless unit. The drawer has a central motor and two squirrel-cage fan elements mounted therein adjacent to a rear panel for drawing air into the drawer through the intake port. Duct structure in the drawer includes chambers for the fan elements open at opposite ends and an output channel for directing air flow from the fan out of the drawer at the front half of a top panel. The air filter is located between the inlet port and the fan and is thus in the path of air flow. In this embodiment, structure preferably is provided for preferentially directing air through the motor into only one of the chambers.

In another form, the filter may be connected to an exhaust duct, in which case, the fan elements and the driving motor are mounted in the rear of the casing in which the drawer operates. The drawer and the casing form a duct structure for control of air flow into the drawer and out at the top of the casing. Controlled flow of air is maintained over the motor from a separate intake port.

For a more complete understanding of the present invention and for further objects and advantages thereof, reference may now be had to the following description taken in conjunction with the accompanying drawings in which.

Figure 1:
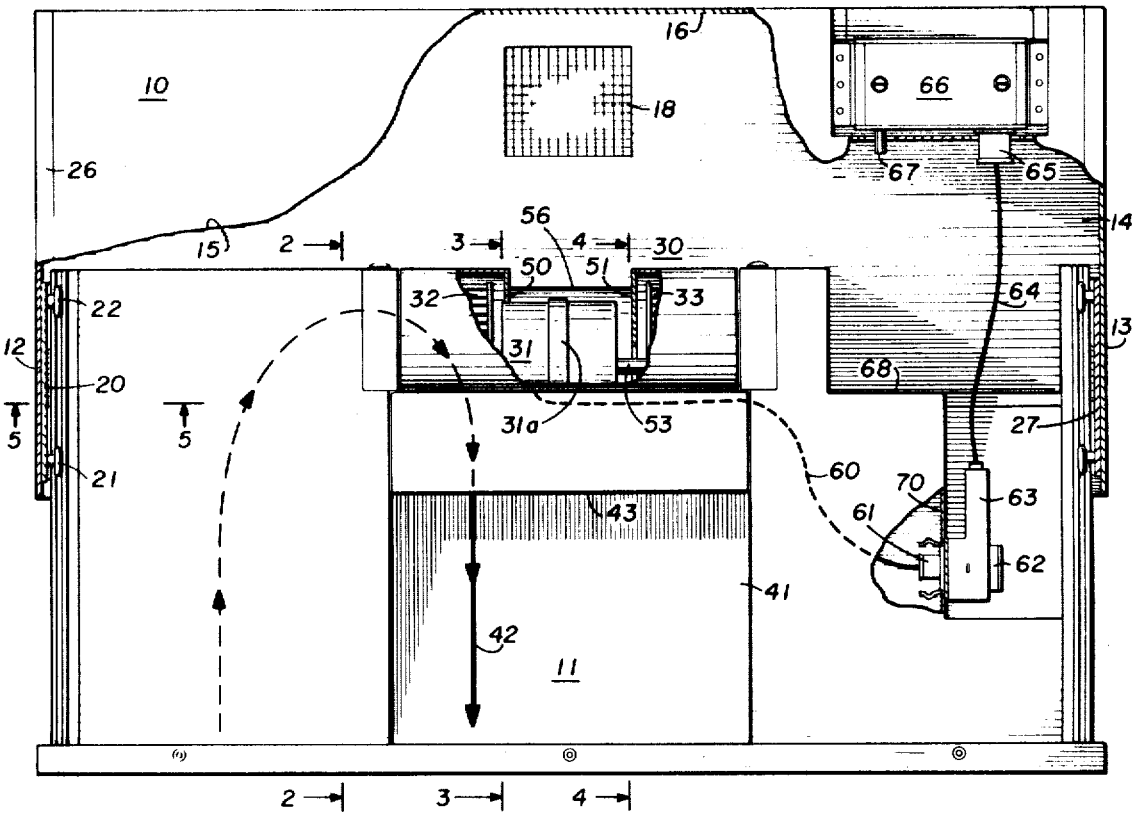
FIGURE 1 is a top view, partially broken away, of a drawer-type hood in which the driving fan is mounted in the drawer.

Referring now to FIGURE 1, a pull out hood is shown. A relatively shallow casing 10 serves as a receptacle into which a drawer 11 may be inserted. The casing 10 has sides 12 and 13, a bottom panel 14, a top panel 15 and a back panel 16. The top panel 15 is shown broken away so that the interior of the casing may be seen. All of the panels except the bottom panel 14 are continuous and are made of suitable sheet metal. However, the bottom panel 14 is provided with a screened aperture 18 near the rear center portion thereof.

Figure 5:
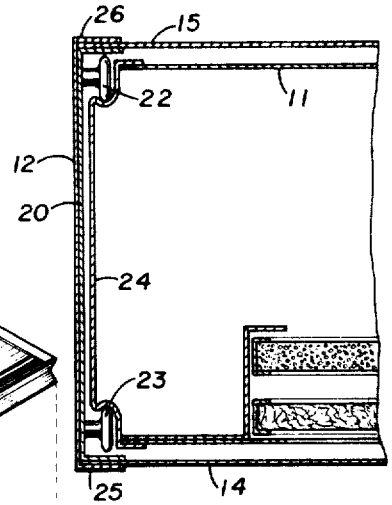
FIGURE 5 is a partial sectional view showing the mounting for the drawer.

As best seen in FIGURE 5, the bottom panel 14 and the top panel 15 are coupled together by the side panel 12 which is formed to overlap the margins of panels 14 and 15. An inner plate 20 is fitted into the unit 10 on the left side and supports two pairs of rollers. As seen in FIGURE 1, rollers 21 and 22 are mounted near the upper margin of the plate 20. As seen in FIGURE 5, roller 22 and roller 23 engage top and bottom grooves extending along the side plate 24 of the drawer unit 11. The plate 20 is broken at right angles near the upper and lower edges thereof to engage the inner surface of the bottom plate 14 and the top plate 15. The bracket 20, plates 12, 14 and 15 may then be secured together, as by welding or riveting, through the flanges 25 and 26, respectively. The end plate 24 of the drawer 11 is suitably formed to provide ways in which the rollers 21–23 operate.

Referring again to FIGURE 1, the filter drawer 11 is supported by the rollers, as above described, by insert 20 and a companion insert 27 on the right hand side. Drawer 11 may be opened to extend from the casing 10 or may be retracted or closed into the casing 10 as required.

Figure 2:
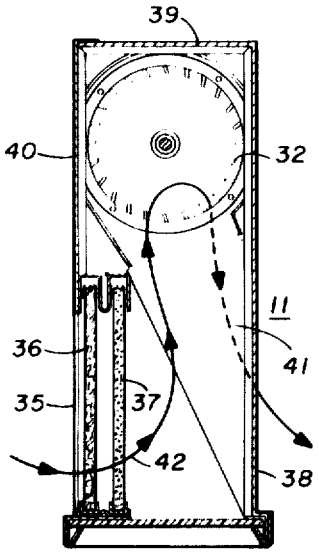
FIGURE 2 is a sectional view taken along line 2—2 of FIGURE 1.

In the embodiment illustrated in FIGURE 1, a twin squirrel-cage fan unit 30 is mounted at the rear of the drawer 11 and comprises a shrouded motor 31 and a pair of squirrel-cage fan elements 32 and 33. As best seen in FIGURE 2, the bottom panel 40 of the drawer 11 has an elongated rectangular opening 35 near the front margin thereof. A pair of filter elements 36 and 37 are supported in suitable mounting brackets in the opening 35. The upper plate 38, the back plate 39 and the partial bottom plate 40 form an enclosure into which the air is drawn through the filter elements 36 and 37, as indicated by arrow 42. The air may then travel rearwardly from the location of the filter elements 36 and 37. The air path is illustrated by the dotted and solid portions of the arrow 42. After leaving the fan 32, the air passes outwardly through an output duct 41 which opens onto the upper front surface of the drawer.

The side of the duct 41 is shown in FIGURE 2. The mouth of the duct 41 may be seen in FIGURE 1. Since the fan unit 30 is mounted at the rear of the drawer 11, the intake air travels through the filters 36 and 37 rearwardly into the ends of the fan elements 32 and 33 and then upward and forward through the duct 41. When the drawer is open, the rear edge 43 of the mouth of the output duct 41 is located slightly rearward of the front edge of the casing 10. The filter 36 is of shredded metal filaments for entrapment of grease and the like. The filter 37 is of activated charcoal which may be replaced or reactivated periodically.

Figure 3:
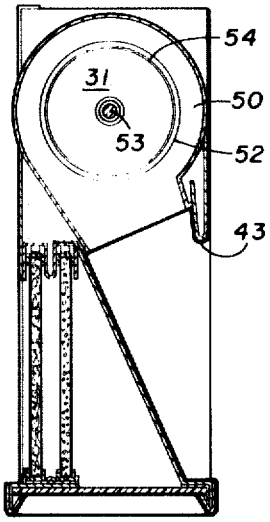
FIGURE 3 is a sectional view taken along line 3—3 of FIGURE 1.
Figure 4:
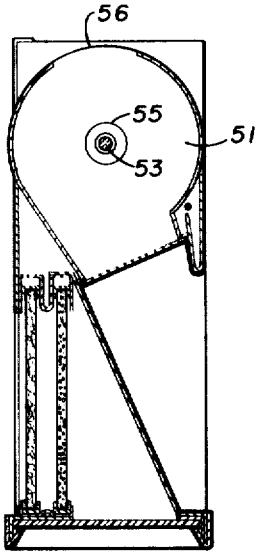
FIGURE 4 is a sectional view taken along line 4—4 of FIGURE 1.

In a preferred embodiment of the invention, the motor 31 is in the form of an uncased motor with a shroud. An open-ended cylindrical shroud encases the motor and assists in anchoring the motor in the drawer. The motor is isolated from the principal flow of intake air by plates 50 and 51. Plate 50 forms an inner wall for the chamber in which the fan element 32 operates. Plate 51 forms an inner wall for the chamber in which the fan element 33 operates. The wall 50 is illustrated in FIGURE 3 and is provided with an enlarged opening 52, coaxial with the shaft 53 of the fan. The end of shroud 54, which encases the motor 31, is also seen in FIGURE 3. The end plate 51 is shown in FIGURE 4. The shaft 53 extending from the motor 31 to the fan element 33 passes through a relatively small opening 55 in the plate 51. When the shaft 53 passes through the plate 50, the large opening 52 receives the end of shroud 54. The shroud for the motor 33 in the region between the plates 50 and 51 has an opening 56 therein. Thus, air will be drawn into the motor compartment through the opening 56, will pass through the motor inside the shroud 54, and will be drawn into the stream of air driven by the fan element 32. The air flow is thus given direction by reason of the large opening 52 in the plate 50, with the shroud 54 being spaced but a minimal distance from the periphery of the opening 52. At the other end where the shaft 53 passes through the small opening 55, air will have a relatively low impedance path for travel to the right end of the shroud 54, through the motor 31, and into the chamber in which the fan element 32 is housed. Air is permitted to enter the casing 10 through the screened opening 18 for passage through the motor 31. This serves to cool the motor and permit an extended operating life thereof.

The motor 31 is energized by way of a cable 60 which terminates in a plug 61. The plug 61 is a male plug which registers with a socket 62 which is mounted on a removable bracket 63. A cord 64 extends from the socket 62 to a male plug 65 which in turn cooperates with a convenience outlet in a supply box 66 which is located in a notch in the upper rear margin of the casing 10. The junction box 66 is thus located outside the zone encompassed by the casing 10, but is within the perimeter of the rectangular polyhedron outline of the casing 10. Power is fed to the plug 65 by way of a push-button switch which is actuated by the button 67. Thus, when the drawer is closed, the rear surface 68 of the drawer engages the button 67 to remove power to the plug 65. The motor will be energized by way of plug 65 any time the drawer 11 is opened. Closing the drawer automatically de-energizes the motor.

In order to meet the Underwriters Laboratories requirements, and at the same time permit the motor and fan unit 30 to be mounted in the drawer, provision has been made for completing the circuit from the supply box 66 to the motor. More particularly, the drawer may be removed by actuating a stop or latch to permit the drawer to travel outwardly beyond the normal operating position. When this is done, the outward movement of the drawer causes the cord 64 to become taut as to pull the plug 65 from its socket. Thus, the drawer can be removed and at the same time the energizing circuit will be broken. When the drawer is to be replaced, the plug 61 will be disengaged from the socket 62, the holder 63 will be disconnected or unsnapped from its moorings in the wall 70 of the drawer 11. The plug 65 will then be inserted into its cooperating socket. The drawer may then be inserted and the holder 63 may then be snapped back into its position in the wall 70. The plug 61 may then be inserted into the receptacle 62 by access through opening 35 upon removal of the filters 36 and 37.

Figure 6:
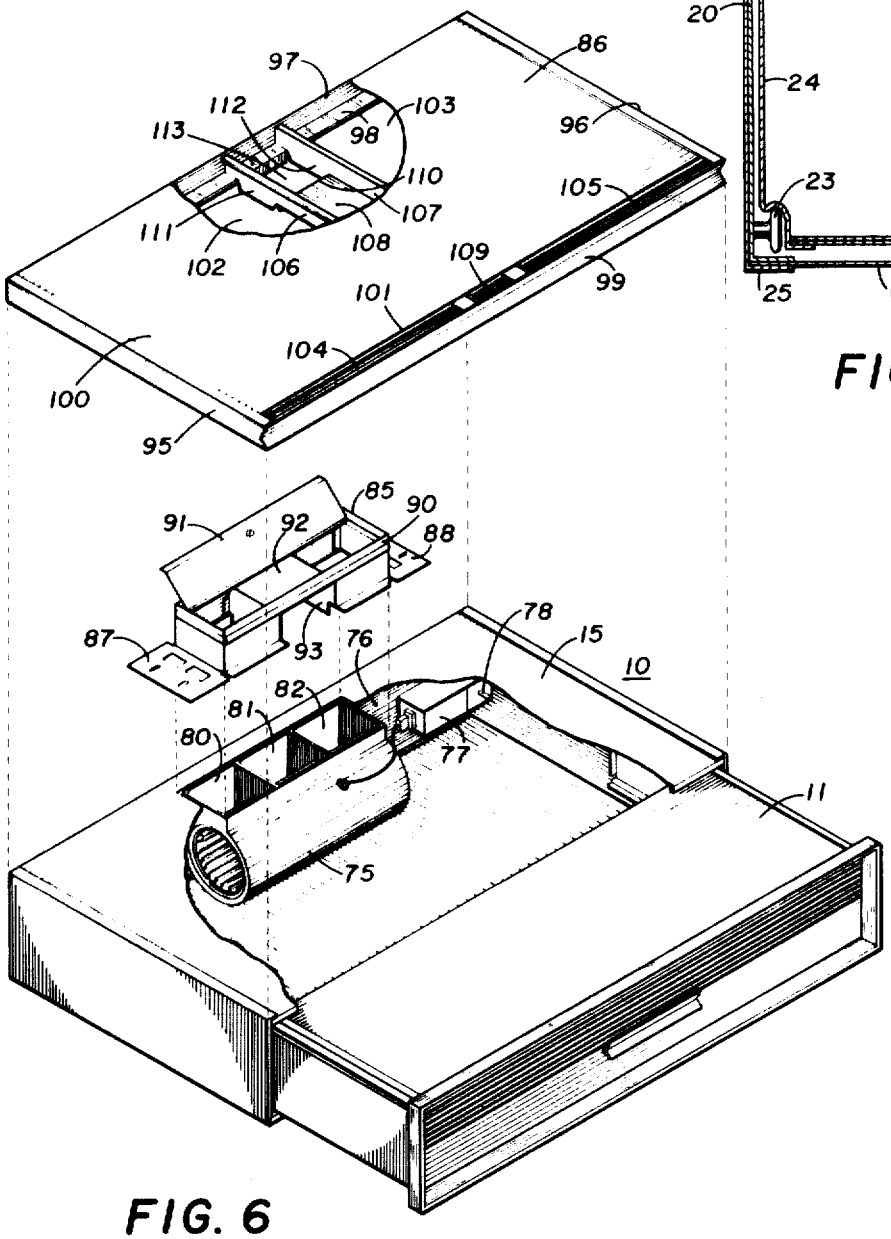
FIGURE 6 is an exploded view of a second embodiment of the invention in which the fan is mounted on the casing rather than in the drawer.

FIGURE 6 illustrates an embodiment of the invention in which the motor unit 75 is mounted on the rear wall 76 of the casing 10. In this embodiment, the drawer 11 is open at the rear and has only the two filters, such as filters 36 and 37, mounted in the front opening in the bottom panel of the drawer 11. The filters are mounted as illustrated in FIGURES 2–5. In the embodiment of FIGURE 6, power is supplied from a supply junction box 77 with a push-button switch actuated by the push-button 78 when the drawer 11 is opened. The fan unit is provided with three upwardly directed openings 80, 81 and 82. Openings 80 and 82 are exhaust ports, and opening 81 is an intake port for air which will serve to cool the motor as above explained in connection with FIGURES 1–5. However, in this case, provision is made externally of the casing 10 for control of the inflow and outflow through the openings 80–82.

More particularly, the unit of FIGURE 6 is provided with a fitting 85 for a vented hood application, and with fitting 86 if no external vent is to be employed. In this case, the filtered air is to be exhausted back into the room in which the unit is installed.

When the unit is to be vented, the mixture 85 is mounted over the openings 80–82 by suitable screws engaging the flanges 87 and 88 to fasten the fixture 85 onto the top plate 15 of the casing 10. The fixture 85 is adapted to be connected at its upper rim 90 to a rectangular exhaust duct which may extend into an attic or to the outside above the location of the hood. Thus, air passing through ports 80 and 82 will flow upwardly through the ducts secured to the rim 90 and will be exhausted. A damper 91 is provided to prevent inflow of air downward from the outside into the hood. A central section 92 is separated from the side portions in the fixture 85 and is open at the front and rear so that air may flow downward into the port 80 for cooling the motor in the unit 75. The motor will be enshrouded and will be ducted into the left and right hand portions of the unit 75 in the manner illustrated in FIGURES 2–4. Thus, air will flow into the port 80 through the shroud over the motor and out through the fan driving air through the duct 80. The fixture 85 has downwardly depending flaps such as the flap 93 which extends downwardly along the side walls of the port 80, thereby to assist in controlling the flow of air downward into the motor.

When the unit is to be employed without an exterior duct, the fixture 86 is substituted for the fixture 85. Fixture 86 has side panels 95 and 96, and a rear panel 97 with an inwardly depending lip 98. A front panel 99 extends across the front edge of the fixture 86. The top panel 100 extends from the rear panel 97 to an edge 101 which is spaced rearwardly of the front panel 99. Thus, air may flow upward into the fixture 86 from ports 80 and 82 and may flow outwardly from the zones 102 and 103 to emerge from slots 104 and 105, respectively. The fixture 86 is provided with a pair of narrow elongated baffle plates 106 and 107. A bottom plate 108 extends from the front portion 109 to the rear margin 110. The plates 106 and 107 have downwardly depending lips 111 and 112. The lips 111 and 112 are adapted to extend downwardly and along the side walls of the port 81. The suction created in port 81 by the fan in unit 75 draws air inward through slot 109 for travel downwardly through the opening 113 and thence into the motor in unit 75. The fixture 86 will be attached to the top of the casing 10 with the opening 113 in registration with the duct 81.

Thus, in accordance with the invention, a casing forms a rectangular polyhedron having a short wide front opening. A drawer is mounted in the casing and is slidable through the opening with an intake port extending across the front half of the bottom drawer panel. The motor and fan mounted within the casing draw air into the drawer through the intake port. Duct structure is provided for directing air flow from the fan out of the casing. In a ductless embodiment, the motor and fan are mounted in the drawer structure itself, with the output duct emerging through the front portion of the top drawer panel. In the ducted embodiment, the motor and fan are mounted at the rear of the casing. In either case, a controlled flow of air is maintained over the motor itself.

Figure 7:
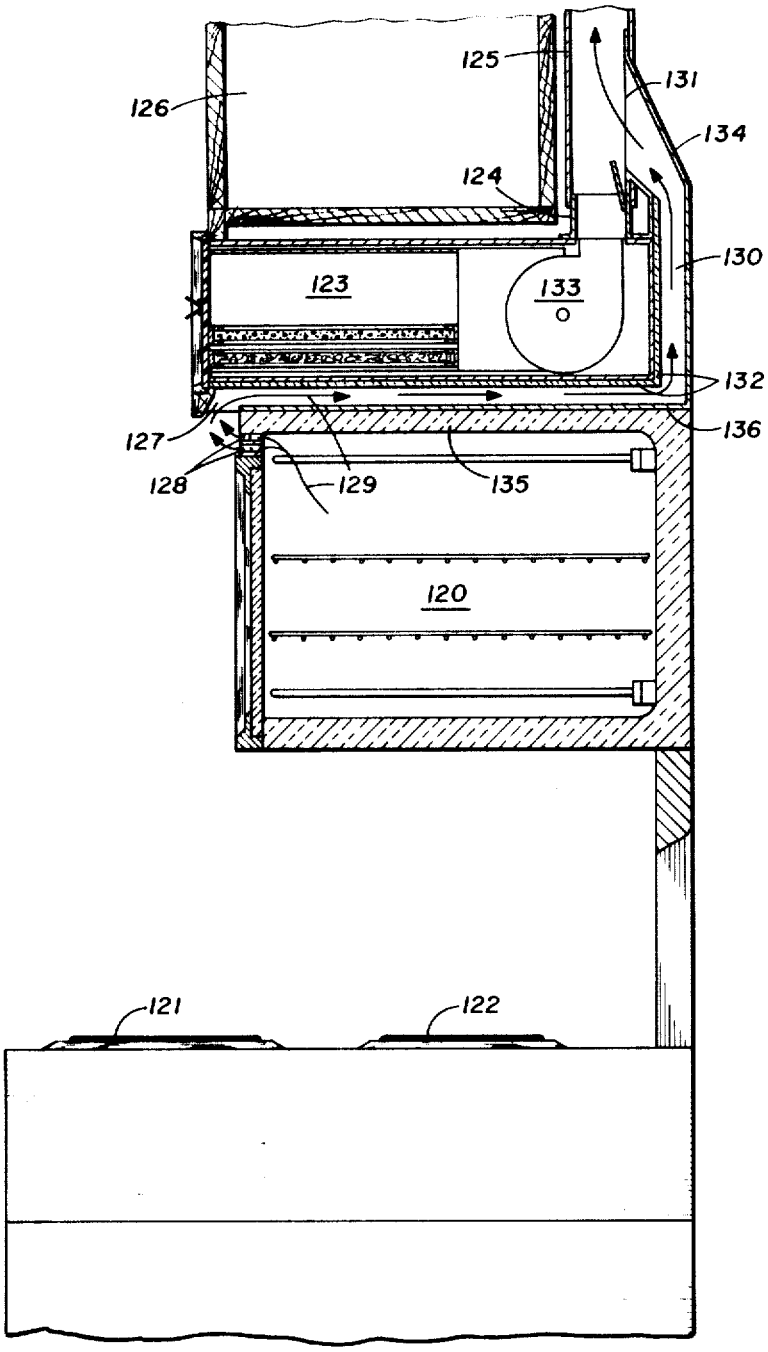
FIGURE 7 illustrates a hood having flow protective action for the fan motor.

FIGURE 7 illustrates a modification of the invention in which the hood of FIGURES 5 and 6 is installed above an oven 120. The construction is such that the motor in the exhaust fan automatically is shielded from excess heat from the oven. The oven 120 is part of a unitary cooking installation in which surface cooking elements 121 and 122 are positioned at counter level with the oven 120 being at eye level. The hood 123 is vented and thus is of generally the same construction as the hood of FIGURES 5 and 6. It is provided with the roll-out construction illustrated in FIGURE 6 and is fitted with the duct unit adapter 124 which is like unit 85 of FIGURE 6. A rectangular vent pipe 125 extends from adapter 124 to atmosphere behind the wall of a cabinet 126. When the surface units 121 and 122 are to be employed, the hood 123 will be extended to exhaust the hot air and the fumes created by the cooking operation on the surface cooking elements. However, when the oven 120 is operated with the hood 123 retracted or closed, a flow channel is provided for bypassing the exhaust hood 123. More particularly, a duct 127 extends across the front of the oven 120 and serves as a flow channel for hot air escaping from the oven through ports 128, as indicated by arrow 129. Hot air from the oven will then flow through the passage 127 along the bottom of the hood 123 and then upward through the vertical riser 130 at the back of the hood 123. The air is then directed into the vertical exhaust duct 125 at the juncture 131. The wall of the hood 123 is covered with an insulating layer 132 to protect the hood 123 from high temperatures when the exhaust fan is not in operation.

The hood construction shown in FIGURE 7 shunts high temperature air along the bottom of the hood and into the duct 125 above the outlet from the blower 133. As described in connection with the embodiment of FIGURE 6, the fan motor is supplied with the cooling air system of FIGURE 7, the flow of heated air from the over 120 through the juncture 131 creates a low pressure within the hood 123 so that cool air will be drawn through the cooling supply duct (duct 81, FIGURE 6) for flow over the blower motor and then upward (through the ducts 80 and 82, FIGURE 6) to the exhaust duct 125. Thus, the blower motor will be shielded from the high temperatures ordinarily encounted when an exhaust hood is installed over an oven. The flow of cool air into the motor, under the force produced by the flow of hot air into the upper reaches of the duct, will maintain the motor cool and thus leave it free from damage even though it is located in close proximity to the oven 120. At the same time, the motor stands ready to exhaust air from above the surface cooking elements 121 and 122. The duct 127, the riser 130, and the adapter 134 leading to the juncture 131 preferably will all have cross-sectional areas adapted to promote flow through duct 127.

The duct 127 may be made integral with the hood 123 or may comprise an adapter unit. In installations where the oven 120 is vented through the top panel 135 rather than through front ports 128, the bottom panel 136 of duct 127 will be perforated.

The unit of FIGURE 7 is particularly suitable for installation over an eye-level oven. The casing has a depth and a width approximately corresponding with the depth and width of the oven. A short, wide opening extends across the front of the casing to receive the filter drawer which is slidable through the front opening. The motor and fan in the casing may be used to draw air into the drawer through a filter in a bottom opening. A first duct directs air flow from the fan to atmosphere. A secondary duct serves to direct air through and over the motor and into the stream of air driven by the fan. A third duct extends along the bottom of the casing and has a bottom inelt port. The third duct has an outlet which communicates with the first duct at a point located downstream of the fan and the motor, so that heated air in the duct above the motor will produce low pressure in the casing when the motor is not in operation. As a result, outside air will flow over the motor to protect it from the heat of the oven.

Having described the invention in connection with certain specific embodiments thereof, it is to be understood that further modifications may now suggest themselves to those skilled in the art and it is intended to cover such modifications as fall within the scope of the appended claims.

What is claimed is:

1. A kitchen filter which comprises:
(a) a casing having the form of a rectangular polyhedron with a short wide front opening,
(b) a drawer slidable through said opening in said casing and having an intake port extending across the front half of a bottom panel,
(c) a motor and fan mounted in said drawer for drawing air into said drawer through said intake port,
(d) duct structure mounted within said drawer for directing air flow from said fan out of said casing.
(e) air filter means located between said port and said fan in the air path, said
(f) a secondary duct structure mounted in said drawer for directing air through said motor and into the air stream from said port.

2. The combination set forth in claim 1 in which said secondary duct structure includes a cylindrical shroud around said motor which is flow connected between the outside of said casing and a low pressure zone in said casing created by said fan.

3. The combination set forth in claim 1 in which said motor is mounted in said drawer and sai dsecondary duct structure is supplied from a secondary port in the rear panel of said drawer and includes a cylindrical shroud around said motor which is flow connected between said secondary port and a low pressure zone in said drawer created by said fan.

4. A kitchen filter which comprises:
(a) a casing having the form of a rectangular polyhedron with a short wide front opening,
(b) a drawer *having a top wall and* slidable through said opening in said casing and having an intake port extending across the front half of the bottom panel,
(c) *cooperating means on the casing and the drawer for supporting the drawer on the casing and for permitting movement of the drawer through the front opening of the casing between a closed position wherein the intake port of the drawer is located within the casing and an open position wherein the intake port is located without the casing,*
[(c)] (*d*) a motor and fan mounted within said casing for drawing air into said drawer through said intake port,
[(d)] (*e*) duct structure formed by a top panel of said casing and a fixture secured [over] *to* said top panel and having an output port along the top front margin of said casing for directing air flow from said fan out of said casing, and

[(e)] (*f*) air filter means *mounted in the drawer and extending across* [located between said intake port and said fan in the air path].

5. A ductless kitchen filter which comprises:
(a) a casing having the form of a rectangular polyhedron with a short wide front opening,
(b) a drawer slidable through said opening and having an intake port extending across the front half of a bottom panel,
(c) fan means mounted in said drawer adjacent to a rear panel thereof for drawing air into said drawer through said intake port,
(d) duct structure in said drawer for directing air flow from said fan out of said drawer at the front half of a top panel, and
(e) air filter means located between said port and said fan in the air path.

6. A ductless kitchen filter which comprises:
(a) a casing having the form of a rectangular polyhedron with a short wide front opening,
(b) a drawer slidable through said opening and having an intake port extending across the front half of a bottom panel thereof,
(c) a motor and fan means mounted in said drawer adjacent to a rear panel thereof for drawing air into said drawer through said intake port,
(d) duct structure in said drawer for directing air flow from said fan out of said drawer at the front half of a top panel,
(e) air filter means located between said port and said fan in the path of air flow, and
(f) structure for directing air through said motor into said duct structure.

7. A ductless kitchen filter which comprises:
(a) a casing having the form of a rectangular polyhedron with a short wide front opening,
(b) a drawer slidable through said opening in said casing and having an intake port extending across the front half of a bottom panel thereof,
(c) a central motor and two squirrel-cage fan elements mounted in said drawer adjacent to a rear panel thereof for drawing air into said drawer through said intake port,
(d) duct structure in said drawer including chambers for said elements open at opposite ends and an output channel for directing air flow from said fan out of said drawer at the front half of a top panel,
(e) air filter means located between said port and said fan in the path of air flow, and
(f) structure for preferentially directing air through said motor into one of said chambers.

8. In a ductless kitchen filter, the combination which comprises:
(a) a rectangular polyhedron casing having top, bottom, and end panels, a short wide rear panel and a short wide front opening,
(b) a drawer slidable into said front opening and having closed front and end panels, a perforated rear panel, a bottom panel open across the front half to form an air inlet port, and a top panel having duct structure opening through the front half thereof forming an outlet port, and
(c) means including a motor and fan mounted in said drawer for moving air from said inlet port to said outlet port.

9. The combination set forth in claim 8 in which:
(a) an electric supply unit is mounted at the rear of said casing,
(b) a flexible linkage extends from said supply unit into said drawer and is connected to said motor, and
(c) a switch means on said supply unit in circuit with said motor which is actuated by contact with the rear panel of said drawer to de-energize said motor.

10. The combination set forth in claim 8 in which an electric supply unit for said motor is mounted at the rear of said casing with a power circuit extending from said unit to said motor including an intermediate connection accessible through said inlet port and a second connection at said supply unit which is broken when said drawer is removed from said casing.

11. In a ductless kitchen filter, the combination which comprises:
(a) a rectangular polyhedron casing having top, bottom, and end panels, a short wide rear panel and a short wide front opening,
(b) a drawer having a closed front panel, closed end panels having top and bottom marginal grooves, a perforated rear panel, a bottom panel open across the front half to form an air inlet port, and a top panel having duct structure opening through the front half thereof forming an outlet port,
(c) a pair of rollers spaced along the end panels of said casing engaging each said marginal groove for slide movement of said drawer into and out of said casing, and
(d) means including a motor and fan mounted in said drawer for moving air from said inlet port to said outlet port.

12. The combination set forth in claim 11 in which a unitary plate supports two pairs of said rollers adjacent to each end of said casing with each said plate being anchored to the top and bottom panels of said casing.

13. A kitchen filter which comprises:
(a) a casing having the form of a rectangular polyhedron with a short wide front opening,
(b) a drawer *having a top wall and* slidable through said opening and having an intake port extending across the front half of a bottom panel,
(c) fan means mounted within said casing adjacent to a rear panel for drawing air into said drawer through said intake port,
(d) duct srtucture in said [drawer] *casing* for directing air flow from said fan out of said casing, and
(e) air filter means *mounted in said drawer* in a plane parallel to said intake port and in the air path leading to said fan.

14. A kitchen filter which comprises:
(a) a casing having the form of a rectangular polyhedron with a short wide front opening,
(b) a drawer slidable through said opening in said casing and having an intake port extending across the front half of a bottom panel,
(c) a motor and fan mounted within said casing for drawing air into said drawer through said intake port,
(d) a first duct structure for directing air flow from said fan to atmosphere above said casing,
(e) air filter means located between said port and said fan in the air path,
(f) a second duct structure for directing air through said motor and into the air stream from said port, and
(g) a third duct structure extending along the bottom of said casing having a bottom port and communicating with said first duct structure at a point located downstream of said fan and said motor.

15. A kitchen exhaust unit for installation over an eye-level oven which comprises:
(a) a casing having depth and width corresponding with the depth and width of said oven and having a short wide front opening,
(b) a drawer slidable through said opening having an intake port therein,
(c) a motor and fan mounted within said casing for drawing air through said drawer,
(d) a first duct structure for directing flow of air from said fan and out of said casing,
(e) filter means mounted in said drawer in the path of air moved by said fan, (f) a secondary duct structure for drawing air from outside said casing through and over said motor and into the airstream driven by said fan, and (g) a third duct structure extending along the bottom of said casing and having a bottom inlet port, said third duct structure having an outlet port communicating with said first duct structure at a point located downstream of said fan and said motor.

16. The combination set forth in claim 15 in which said bottom inlet port in said third duct extends along the top front margin of said oven.

17. The combination set forth in claim 15 in which said third duct structure has an insulating wall separating it from the zone in said casing occupied by said drawer, motor and fan.

18. In a kitchen filter, the combination which comprises:

(a) a casing having the form of a notched rectangular polyhedron with a short wide front opening, (b) a drawer mechanism slidable through said opening in said casing and having an intake port extending across the front half of a bottom panel thereof, (c) a motor and fan mounted within said drawer for drawing air into said drawer through said intake opening, (d) duct structure mounted within said drawer for directing air flow to and from said fan and out of said drawer, (e) air filter means located between said port and said fan in the air path, (f) an electrical supply box positioned within the outline of said rectangular polyhedron and shielded from air flowing from said intake port through said duct, (g) removable electrical connection extending from said supply box to said motor, and (h) switch means within said casing positioned in the path of movement of said drawer and operable in dependence upon opening of said drawer to supply power to said motor and fan.

19. A kitchen filter which comprises:

(a) a casing of rectangular polyhedron form with a short wide front opening and an inwardly depending notch in a rear portion thereof, (b) a drawer slidable through said opening in said casing and having an intake port extending across the front half of the bottom panel thereof, (c) a motor and fan mounted in said drawer for drawing air into said drawer through said intake port, (d) duct structure mounted within said drawer for directing air flow to and from said fan and out of said drawer, (e) air filter means located between said port and said fan in the air path, (f) an electrical supply box mounted in said notch within said rectangular polyhedron form, (g) a removable electrical circuit extending from said box to said motor, and (h) switch means within said casing positioned in the path of movement of said drawer and operable in dependence upon opening of said drawer to supply power to said motor and fan.

References Cited

The following references, cited by the Examiner, are of record in the patented file of this patent or the original patent.

UNITED STATES PATENTS

| | | | |
|---|---|---|---|
| 2,828,683 | 4/1958 | Joseph et al. | 98—115 K |
| 2,836,114 | 5/1958 | Weaver et al. | 98—115 K |
| 2,886,124 | 5/1959 | Scharmer | 98—115 K |
| 3,026,788 | 3/1962 | Spear | 98—115 K |
| 3,031,946 | 5/1962 | Watt et al. | 98—115 K |
| 3,051,158 | 8/1962 | Kimberley | 98—115 K |
| 3,075,335 | 1/1963 | Bandlow | 98—115 K |
| 3,089,479 | 5/1963 | Perl | 98—115 K |
| 3,249,037 | 5/1966 | Stalker | 98—115 K |
| 3,251,540 | 5/1966 | Kinswothy | 55—467 |
| 3,291,029 | 12/1966 | Henne | 98—115 K |
| 3,356,008 | 12/1967 | Simpson et al. | 98—115 K |
| 3,364,664 | 1/1968 | Doane | 98—115 K |

FOREIGN PATENTS

| | | | |
|---|---|---|---|
| 888,823 | 2/1962 | Great Britain | 98—115 K |

FRANK W. LUTTER, Primary Examiner

B. NOZICK, Assistant Examiner

U.S. Cl. X.R.

98—115 K

PO-1050
(5/69)

UNITED STATES PATENT OFFICE
CERTIFICATE OF CORRECTION

Patent No. Re. 27,225 Dated November 9, 1971

Inventor(s) J. E. STALKER

It is certified that error appears in the above-identified patent and that said Letters Patent are hereby corrected as shown below:

Column 1, line 32 "filtartion" should be --filtration--;
Column 5, line 52 after "air" add --which enters by way of the channel 81, FIGURE 6. In the--;
Column 5, line 54 "over" should be --oven--;
Column 6, line 13 "inelt" should be --inlet--;
Column 6, line 49 "sai dsecondary" should be --said secondary--;
Column 9, line 35 "connection" should be --connections--.

Signed and sealed this 25th day of July 1972.

(SEAL)
Attest:

EDWARD M.FLETCHER,JR.
Attesting Officer

ROBERT GOTTSCHALK
Commissioner of Patents